(12) United States Patent
Fujita et al.

(10) Patent No.: US 7,038,998 B2
(45) Date of Patent: May 2, 2006

(54) OPTICAL RECORDING DISK HAVING LAND AND GROOVE WOBBLED AT OUTER CIRCUMFERENCE SIDE

(75) Inventors: Goro Fujita, Tokyo (JP); Tetsuhiro Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 10/220,266

(22) PCT Filed: Jan. 9, 2002

(86) PCT No.: PCT/JP02/00028

§ 371 (c)(1),
(2), (4) Date: Jan. 15, 2003

(87) PCT Pub. No.: WO02/056308

PCT Pub. Date: Jul. 18, 2002

(65) Prior Publication Data

US 2004/0076111 A1 Apr. 22, 2004

(30) Foreign Application Priority Data

Jan. 9, 2001 (JP) ................................. 2001-1835

(51) Int. Cl.
*G11B 7/24* (2006.01)
(52) U.S. Cl. .................................................. 369/275.4
(58) Field of Classification Search ............. 369/275.4, 369/275.3, 275.2, 275.1, 277, 278, 279, 13.55, 369/13.56; 428/64.4, 64.1, 64.3; 430/320, 430/321
See application file for complete search history.

(56) References Cited

U.S. PATENT DOCUMENTS

| | | | | | |
|---|---|---|---|---|---|
| 5,696,742 | A | * | 12/1997 | Ogata et al. | 369/47.22 |
| 5,852,599 | A | * | 12/1998 | Fuji | 369/275.4 |
| 5,909,412 | A | * | 6/1999 | Nakayama et al. | 369/44.13 |
| 5,933,411 | A | * | 8/1999 | Inui et al. | 369/275.4 |
| 5,940,364 | A | * | 8/1999 | Ogata et al. | 369/275.4 |

(Continued)

FOREIGN PATENT DOCUMENTS

JP 5-314538 11/1993

(Continued)

*Primary Examiner*—Tan Dinh
(74) *Attorney, Agent, or Firm*—Oblon, Spivak, McClelland, Maier & Neustadt, P.C.

(57) ABSTRACT

An optical recording medium having a wobble desirably arranged in a production process when having wobble at part of interfaces of lands and grooves is provided. An optical recording medium comprising an approximately disk-shaped disk substrate 15, formed in its surface with trenches 15a and having projections and recesses divided for every track region by the trenches 15a, on which are stacked an optical recording layer 16 having relief shapes corresponding with the trenches 15a and a protection film 17 and of a format where both regions of the projections (lands L) and the recesses (grooves G) are used as recording regions etc., wherein wobble W for providing clock information or address information is formed, between a pair of facing side walls forming each trench 15a, in a side wall portion at an inner circumferential side of the disk substrate 15 when seen from the recess (groove G) and at an outer circumferential side of the disk substrate 15 when seen from the projection (land L).

4 Claims, 13 Drawing Sheets

U.S. PATENT DOCUMENTS

| | | | |
|---|---|---|---|
| 6,128,271 A * | 10/2000 | Ohta | 369/275.4 |
| 6,233,219 B1 * | 5/2001 | Hori et al. | 369/275.4 |
| 6,292,458 B1 * | 9/2001 | Eguchi et al. | 369/275.3 |
| 6,335,070 B1 * | 1/2002 | Tomita | 369/275.4 |
| 6,377,537 B1 * | 4/2002 | Maeda et al. | 369/275.4 |
| 6,594,224 B1 * | 7/2003 | Muramatsu et al. | 369/275.4 |
| 6,791,938 B1 * | 9/2004 | Endoh | 369/275.4 |
| 6,804,190 B1 * | 10/2004 | Ishida et al. | 369/275.4 |
| 6,807,144 B1 * | 10/2004 | Kim et al. | 369/275.4 |
| 6,819,650 B1 * | 11/2004 | Deno et al. | 369/275.4 |

FOREIGN PATENT DOCUMENTS

| | | |
|---|---|---|
| JP | 9-120584 | 5/1997 |
| JP | 9-245351 | 9/1997 |
| JP | 2000-90496 | 3/2000 |

* cited by examiner

OPTICAL RECORDING DISK HAVING LAND AND GROOVE WOBBLED AT OUTER CIRCUMFERENCE SIDE

TECHNICAL FIELD

The present invention relates to an optical recording medium (hereinafter also referred to as an "optical disk"), more particularly relates to an optical recording medium capable of high density recording.

BACKGROUND ART

In recent years, along with the development of technology for digitally recording moving pictures, still pictures, and other video data, large volumes of data are now being handled. CD or DVD and other optical disk devices are now in the limelight as large volume recording devices. Research for further increasing capacity is also underway.

FIG. 1 is a sectional view of a conventional optical disk.

Trenches 15a are provided in one surface of a light transmission type disk substrate 15 having a thickness of about 1.2 mm. An optical recording layer 16 comprised of for example a dielectric film, a recording film, another dielectric film, a reflection film, etc. stacked in that order is formed on this surface. The film configuration and the number of layers are different according to the type of the recording material and the design.

A protection layer 17 is formed above the optical recording layer 16.

When recording on or reproducing from the optical disk, a laser beam of a predetermined wavelength or other light is focused on the optical recording layer 16 from the disk substrate 15 side.

When reproducing from the optical disk, return light reflected at the optical recording layer 16 is received by a light receiving element, a predetermined signal is generated by a signal processing circuit, and a reproduction signal is extracted.

In the optical disk as described above, the optical recording layer 16 also has relief shapes corresponding to the trenches 15a provided in the surface of the disk substrate 15. These trenches 15a divide the track regions.

Below, regions projecting outward to the protection layer 17 side when seen from the disk substrate 15 will be referred to as "lands L", while recessed regions will be referred to as "grooves G".

In accordance with the design of the optical disk, one or both of the above divided lands L and grooves G are selected as the recording regions.

FIG. 1A is a sectional view of an optical disk of a format wherein for example only the land L regions are used as the recording regions, and the groove G regions are provided as regions for dividing the track regions.

Further, in other optical disks, there is also a format wherein only the groove G regions are used as the recording regions, and the land L regions are provided as regions for dividing the track regions.

Further, in order to improve the surface recording density, a land-groove recording format using both the regions of the lands L and grooves G as recording regions etc. has been developed.

This deals with the servo signal attenuation due to the optical MTF (modulation transfer function) hindering higher density in the track direction by using both of the lands L and the grooves G so as to obtain double the recording tracks of the cycle of generation of the tracking error signal, that is, the group pitch, and thus increase the recording density.

Further, a depth modulation recording format alternately arranges grooves having different depths to double the length of the cycle of generation of the tracking error signal so as to extend the optical limit and thus increase the recording density.

On the other hand, it is possible to make the inner surface forming the trench 15a formed in the disk substrate 15 meander, that is, form a so-called "wobble".

For example, in one format of a MD (Minidisc), as shown in FIG. 1B, only the land L regions are used as the recording regions, the groove G regions are provided as regions for dividing the track regions, and grooves G formed with wobbles W and grooves G not formed with wobbles W and having inner surfaces extending linearly are alternately arranged.

From the above wobble W, a predetermined wobble matrix circuit or the like detects address information of the tracks, a clock for controlling the rotational speed of the disk, and the like. When recording address information or the like in the wobble, address information becomes unnecessary at the optical recording layer in the lands and grooves, so the recording density can be improved by that amount.

It is also possible to apply the wobble to the land-groove recording format and depth modulation recording format.

However, in order to prevent interference of adjacent track information due to optical MTF, it can be considered to form the wobble on one side of the wall surfaces of land-groove interfaces in the land-groove recording format or to arrange grooves having wobbles at a predetermined cycle similar to the cycle of the depth of grooves in the depth modulation recording format, but there is nothing prescribing the arrangement of wobbles. No optical disks having wobbles arranged desirably for the production process such as the mastering step, molding step, and a film formation step has yet been known.

DISCLOSURE OF THE INVENTION

The present invention was made in consideration with the above circumstance. Accordingly, an object of the present invention is to provide an optical recording medium of the land-groove recording format, the depth modulation recording format, etc. having wobble arranged at part of the interface of the lands and the grooves, wherein the wobbles are arranged in a desired fashion for the production process.

To achieve the above object, the optical recording medium of the present invention comprises an approximately disk-shaped disk substrate formed with trenches in a surface thereof and having projections and recesses divided for every track region by the trenches, an optical recording layer formed on the disk substrate on the trench forming surface and having relief shapes corresponding to the trenches, and a protection film formed on the optical recording layer, wherein wobble is formed, between a pair of facing side walls forming each trench, in a side wall portion at an inner circumferential side of the disk substrate when seen from the recess and at an outer circumferential side of the disk substrate when seen from the projection.

In the above optical recording medium of the present invention, preferably the wobble provides at least clock information or address information.

In the above optical recording medium of the present invention, preferably both of the projections and the recesses divided for every track region on the optical recording layer are used as recording regions.

In the above optical recording medium of the present invention, preferably the disk substrate is a plastic substrate to which a relief pattern is transferred from a stamper having relief of a reverse pattern to the pattern of projections and the recesses divided by the trenches.

In the above optical recording medium of the present invention, on an approximately disk-shaped disk substrate, formed with trenches in its surface and having projections and recesses divided for every track region by the trenches, are stacked an optical recording layer having relief shapes corresponding to the trenches and a protection film. In the optical recording medium of a format where both regions of the projections (lands) and recesses (grooves) are used as recording regions, etc. wobble for providing clock information or address information is formed, between a pair of facing side walls forming each trench, in a side wall portion at the inner circumferential side of the disk substrate when seen from the recess (groove) and at the outer circumferential side of the disk substrate when seen from the projection (land).

In an optical recording medium of the land-groove recording format etc., at the time of molding the disk substrate to which the relief pattern is transferred from a stamper having relief of a reverse pattern to the pattern of projections and recesses divided by the trenches, the side wall portions at the outer circumferential side of the disk substrate when seen from the recesses (grooves) and at the inner circumferential side of the disk substrate when seen from the projections (lands) are easily damaged, so if wobble were provided there, the quality of the wobble signal might end up dropping. Also, if wobble were provided in the above portions, the problem of cross write, that is, the signal of a groove being erased when writing at a land or conversely the signal of a land being erased when writing at a groove, would increase.

On the other hand, the side wall portions at the inner circumferential side of the disk substrate when seen from the recesses (grooves) and at the outer circumferential side of the disk substrate when seen from the projections (lands) are not easily damaged, so if wobble is provided there, a drop in quality of the wobble signal can be prevented and an increase of the problem of cross write can be suppressed.

Namely, there is provided an optical recording medium of the land-groove recording format etc. having wobble at part of the interfaces of lands and grooves, wherein the wobble is desirably arranged for the production process.

Further, to attain the above object, the optical recording medium of the present invention comprises an approximately disk-shaped disk substrate formed in a surface thereof with a plurality of types of trenches differing in depth and having projections and recesses divided for every track region by the trenches, an optical recording layer formed on the disk substrate on the trench forming surface and having relief shapes corresponding to the trenches, and a protection film formed on the optical recording layer, wherein wobble is formed in side wall portions of shallower trenches among the plurality of types of trenches differing in depth.

In the above optical recording medium of the present invention, preferably the disk substrate is formed with, as the trenches, first trenches of a first depth and second trenches of a second depth deeper than the first depth and the wobble is formed in the side wall portions of the first trenches.

In the above optical recording medium of the present invention, preferably the wobble provides at least clock information or address information.

In the above optical recording medium of the present invention, preferably one of the projections and the recesses divided for every track region on the optical recording layer is used as a recording region.

In the above optical recording medium of the present invention, preferably the disk substrate is a plastic substrate to which a relief pattern is transferred from a stamper having relief of a reverse pattern to the pattern of projections and recesses divided by the trenches.

In the above optical recording medium of the present invention, on an approximately disk-shaped disk substrate, formed in its surface with a plurality of types of trenches differing in depth and having projections and recesses divided for every track region by the trenches, are stacked an optical recording layer having relief shapes corresponding to the trenches and a protection film. In the optical recording medium of a format where one region of the projections (lands) or recesses (grooves) is used as the recording region, etc., wobble is formed in the side wall portions of shallower trenches among the plurality of types of trenches differing in depth.

For example, as the trenches provided in the disk substrate, first trenches of a first depth and second trenches of a second depth deeper than the first depth are formed, and wobble is formed in the side wall portions of the first trenches.

In the optical recording medium of the depth modulation recording format etc., at the time of molding the disk substrate to which the relief pattern is transferred from a stamper having relief a reverse pattern to the pattern of the projections and recesses divided by the trenches, the side wall portions of the deeper trenches are easily damaged, so if the wobble were provided there, the quality of the wobble signal might end up dropping.

On the other hand, the side wall portions of the shallower trenches are not easily damaged at the time of molding the disk substrate, so if the wobble is provided there, a drop in the quality of the wobble signal can be prevented.

Namely, there is provided an optical recording medium of the depth modulation recording format etc. having wobble at part of the interfaces of lands and grooves, wherein the wobble is desirably arranged for the production process.

BRIEF DESCRIPTION OF THE DRAWINGS

FIG. 1A is a sectional view of an optical disk according to a conventional example, while

FIG. 2A is a perspective view of an optical disk according to a first embodiment, while

FIG. 3A is a schematic view showing a sectional structure corresponding to an enlarged view of an $Y_1$ portion in FIG. 2B and a method of focusing light, while

FIGS. 4A to 4H are sectional views showing production steps of the optical disk according to the first embodiment, wherein FIG. 4A shows the state up to a step of forming an original disk, FIG. 4B shows the state up to an exposure and development step, FIG. 4C shows the state up to a step of forming a metal master, FIG. 4D shows the state up to a step of forming a mother, FIG. 4E shows the state up to a step of forming a stamper, FIG. 4F shows the state up to a step of forming a disk substrate, FIG. 4G shows the state up to a step of forming an optical recording layer, and FIG. 4H shows the state up to a step of forming a protection layer.

FIG. 9A is a sectional view of an optical disk according to a second embodiment, while

BEST MODE FOR WORKING THE INVENTION

Below, a detailed explanation will be given of embodiments of the present invention by using the drawings.

First Embodiment

Figure 1A:
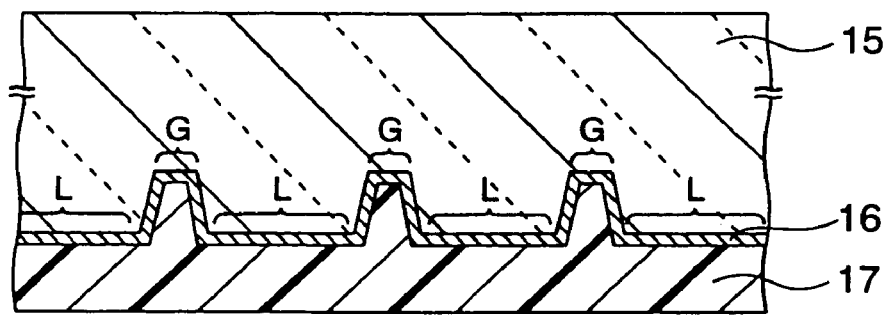
Figure 1B:
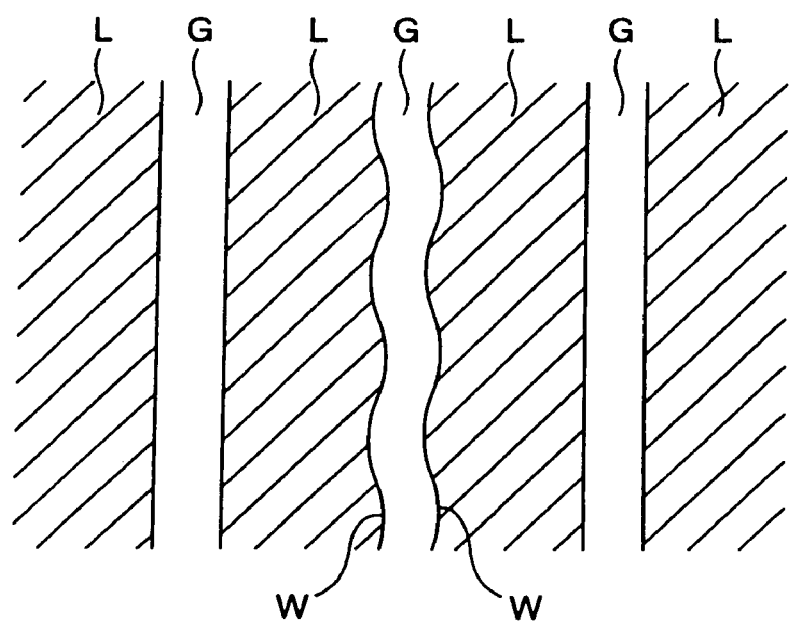
FIG. 1B is a plan view of the optical disk showing a shape and arrangement of trenches dividing the lands and grooves.
Figure 2A:
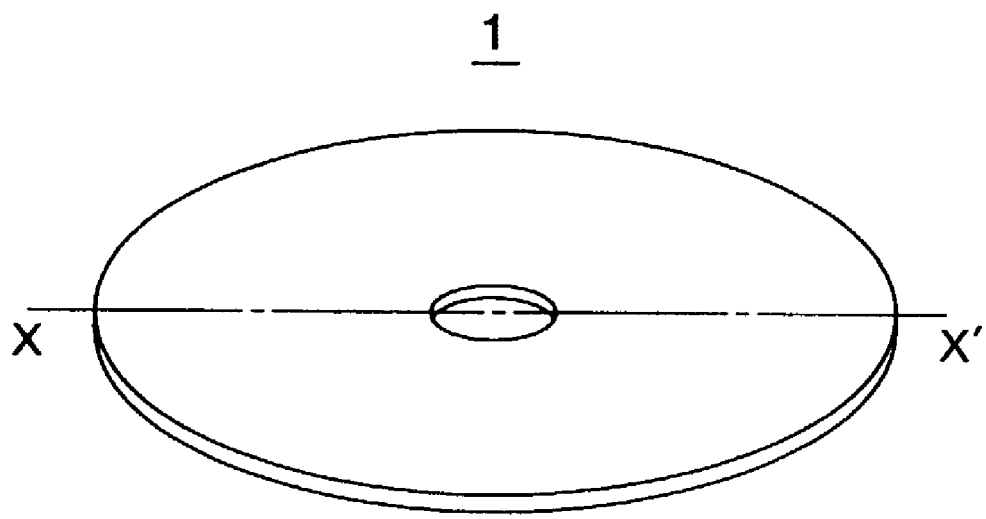
Figure 2B:
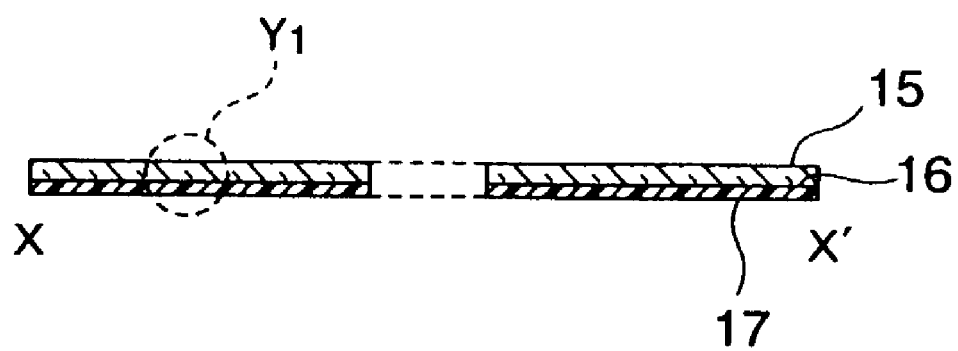
FIG. 2B is a sectional view along X–X' in FIG. 2A.

FIG. 2A is a perspective view of an optical disk according to the present embodiment, while FIG. 2B is a sectional view along X–X' in FIG. 2A.

An optical disk 1 has a laminate of a disk substrate 15, optical recording layer 16, and protection layer 17 and has an approximately disk shape having an opening at its center.

Figure 3A:
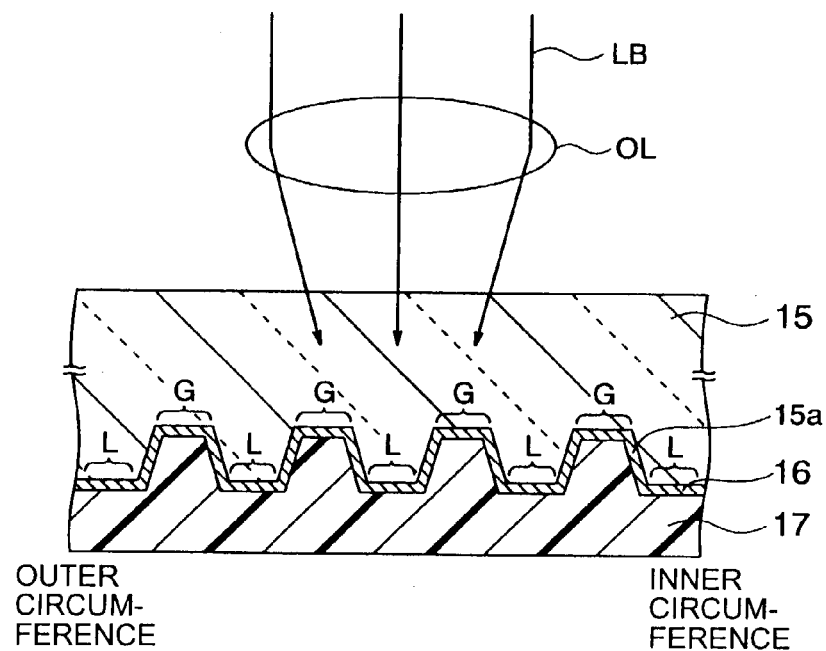

FIG. 3A is a schematic view showing a sectional structure corresponding to an enlarged view of the $Y_1$ portion in FIG. 2B and a method of focusing light. In the figure, the right side is the inner circumferential side of the disk, and the left side is the outer circumferential side.

Trenches 15a are provided in one surface of the disk substrate 15 having a thickness D1 of 1.1 to 1.2 mm. An optical recording layer 16 comprised for example of a dielectric film, recording film, another dielectric film, and a reflection film stacked in that order is formed on that surface. The film configuration and number of layers differ according to the type of the recording material and the design.

The protection layer 17 is formed above the optical recording layer 16.

In the above optical disk, the optical recording layer 16 is formed with relief shapes corresponding to the trenches 15a. The track regions are divided into regions projecting outward to the protection layer 17 side when seen from the disk substrate 15, that is, lands L, and recessed regions, that is, grooves G.

In the present embodiment, for example both the regions of the lands L and the grooves G are used as recording regions.

Figure 3B:
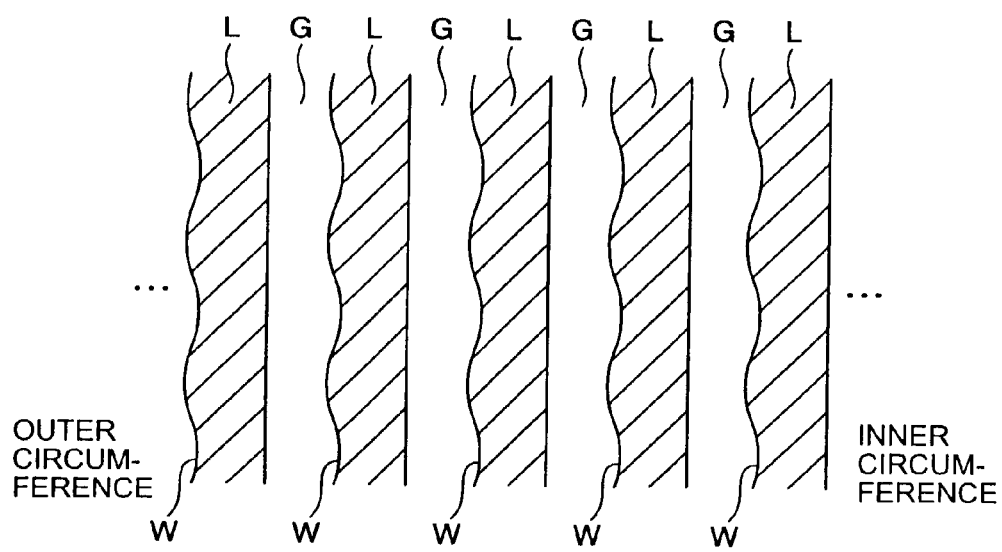
FIG. 3B is a plan view of the optical disk showing the shape and the arrangement of trenches dividing the lands and grooves.

FIG. 3B is a plan view of the optical disk showing the shape and arrangement of the trenches 15a dividing the lands L and grooves G in the above optical disk and corresponds to a top view of the optical disk of the sectional view shown in FIG. 3A. In the figure, the right side is the inner circumferential side of the disk, and the left side is the outer circumferential side.

Among the pair of facing side walls forming each trench 15a, the wobble W for providing the clock information or address information is formed in the side wall portion at the inner circumferential side of the disk substrate when seen from the groove G and at the outer circumferential side of the disk substrate when seen from the land L.

The optical disk of the present embodiment can be recorded on or reproduced from by an optical disk drive having a usual configuration. At the time of recording or reproduction, as shown in FIG. 3A, a laser beam LB for reproduction or recording is focused by an object lens OL or the like, passes through the light transmission type disk substrate 15, and strikes the optical recording layer 16 of the optical disk of the above structure.

At the time of reproduction, the return light reflected at the optical recording layer is received at a light receiving element, a predetermined signal is generated by the signal processing circuit, and the reproduction signal is extracted.

Namely, from the received signal obtained by receiving the reflected beam, various predetermined matrix circuits or the like detect, for example, a focus error signal by the astigmatism method, a tracking error signal by the differential push pull method or other servo error signal, an RF signal, or a wobble signal for performing the detection of a clock signal synchronized with the disk rotation and addresses etc.

An explanation will be given next of the method for production of the optical disk of the present embodiment.

Figure 4A:
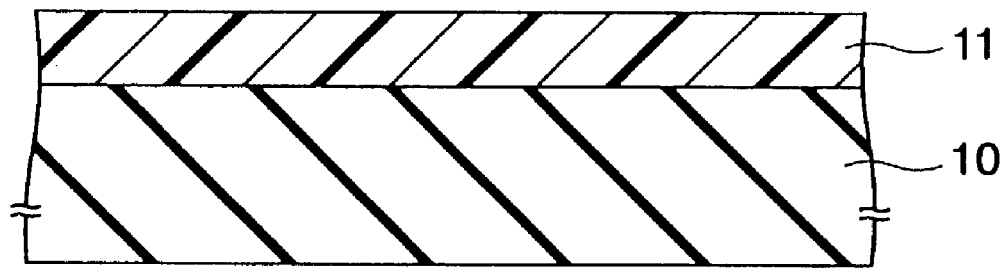

First, as shown in FIG. 4A, an original disk comprised of a glass substrate 10 formed with a resist film 11 is prepared.

Figure 4B:
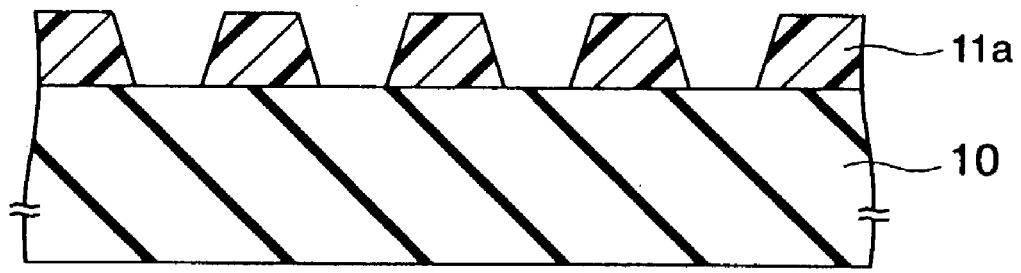

Next, as shown in FIG. 4B, a laser beam or electron beam etc. is used to expose the resist film 11 by a pattern exposing for example the regions for forming the trenches of the disk substrate, then this is developed to form a resist film 11a of a pattern open at regions for forming the trenches of the disk substrate.

In this exposure step, the resist film 11a is patterned to finally obtain a pattern where wobble W is formed in the side wall portions at the inner circumferential side of the disk substrate when seen from the grooves G and at the outer circumferential side of the disk substrate when seen from the lands L as described above in the structure of the optical disk.

Figure 4C:
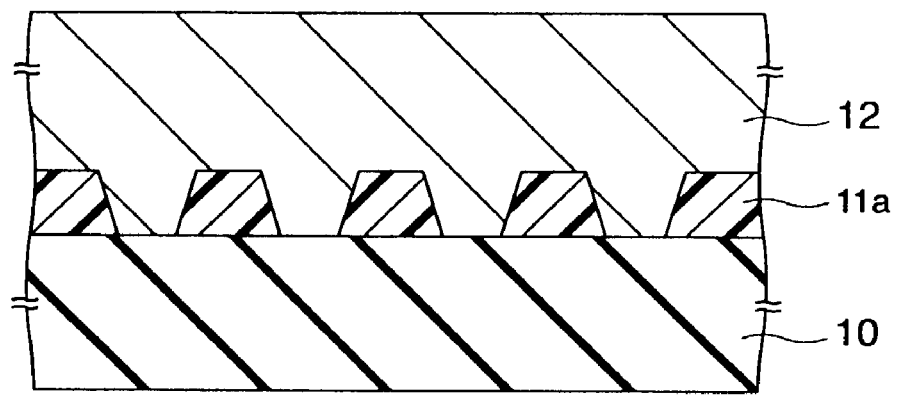

Next, as shown in FIG. 4C, for example silver plating or other film forming processing is used to form a metal master 12 on the resist film 11a on the glass substrate 10. The surface of the metal master 12 has transferred to it the relief of a reverse pattern to the relief of the pattern formed by the glass substrate 10 and the resist film 11a.

Figure 4D:
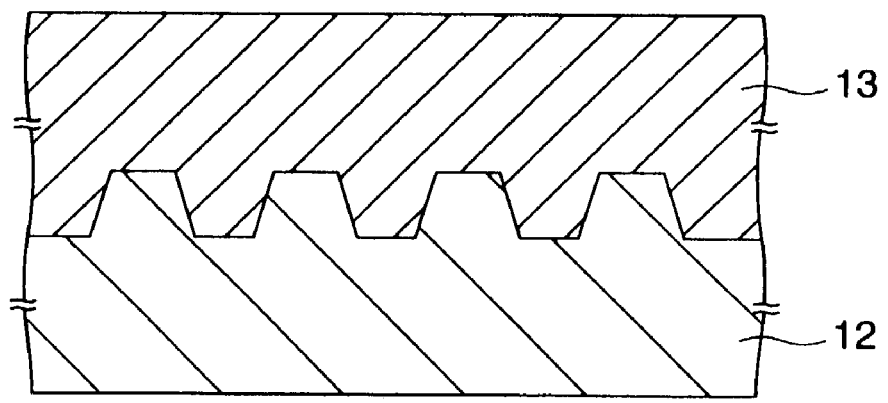

Next, as shown in FIG. 4D, the mother 13 is formed on the metal master 12. The surface of the mother 13 has transferred to it the relief of a reverse pattern to the relief of the surface of the metal master 12. In the figure, the metal master 12 is drawn arranged at the bottom and turned upside down with respect to FIG. 4C.

Figure 4E:
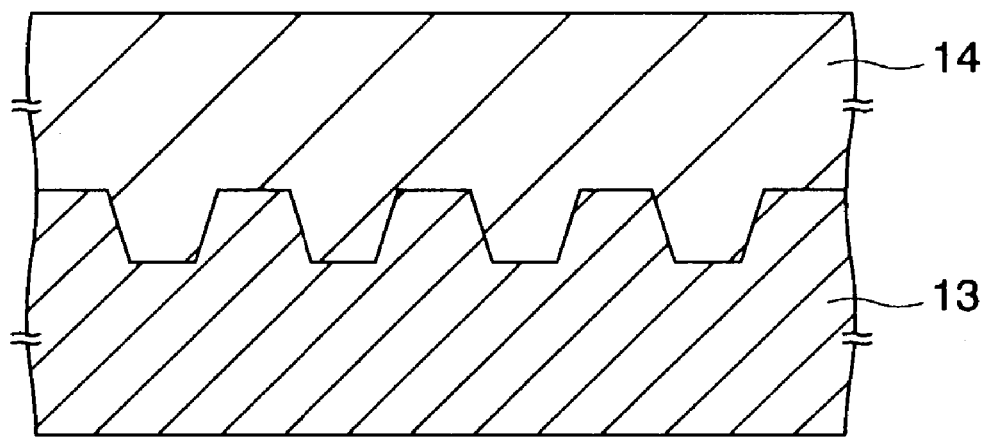

Next, as shown in FIG. 4E, the stamper 14 is formed on the mother 13. The surface of the stamper 14 has transferred to it the relief of a reverse pattern to the relief of the surface of the mother 13. In the figure, the mother 13 is drawn arranged at the bottom and turned upside down with respect to FIG. 4D.

Figure 4F:
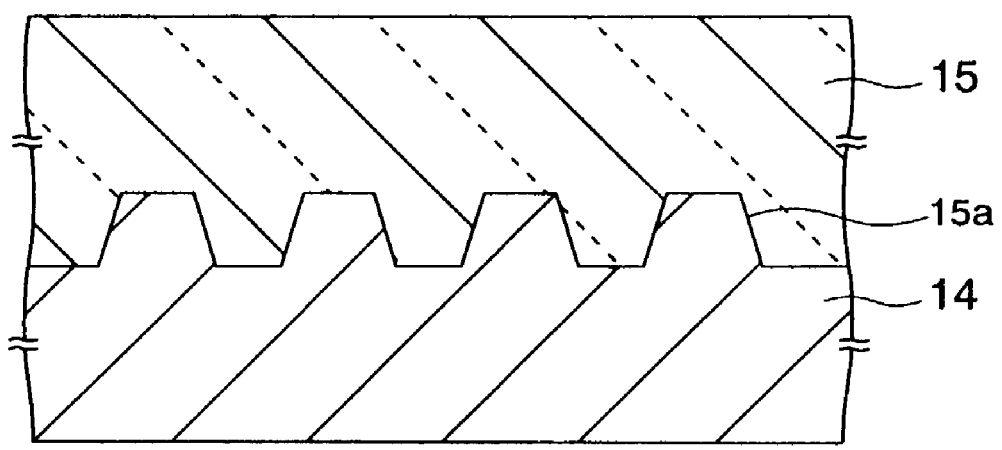

Next, as shown in FIG. 4F, for example, compression molding, injection molding, 2P (photo polymerization), etc. is used to form on the relief pattern of the stamper 14 a polycarbonate or other plastic substrate, that is, the disk substrate 15. The disk substrate 15 has transferred to it trenches 15*a* forming relief of a reverse pattern to the relief of the surface of the stamper 14. In the figure, the stamper 14 is drawn arranged at the bottom and turned upside down with respect to FIG. 4E.

By the above steps, a disk substrate having trenches of a pattern same to the pattern of the openings formed by the resist film 11*a* formed at the step shown in FIG. 4B, that is, trenches of a pattern where wobble W is formed in the side wall portions at the inner circumferential side of the disk substrate when seen from the grooves G and at the outer circumferential side of the disk substrate when seen from the lands L can be formed.

Figure 4G:
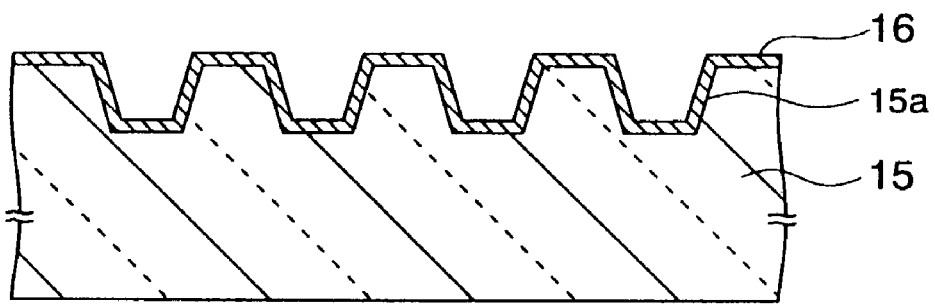

Next, as shown in FIG. 4G, for example sputtering is used to form an optical recording layer 16 having a laminate of for example a dielectric film, a recording layer, another dielectric film, and a reflection film in that film formation order.

Figure 4H:
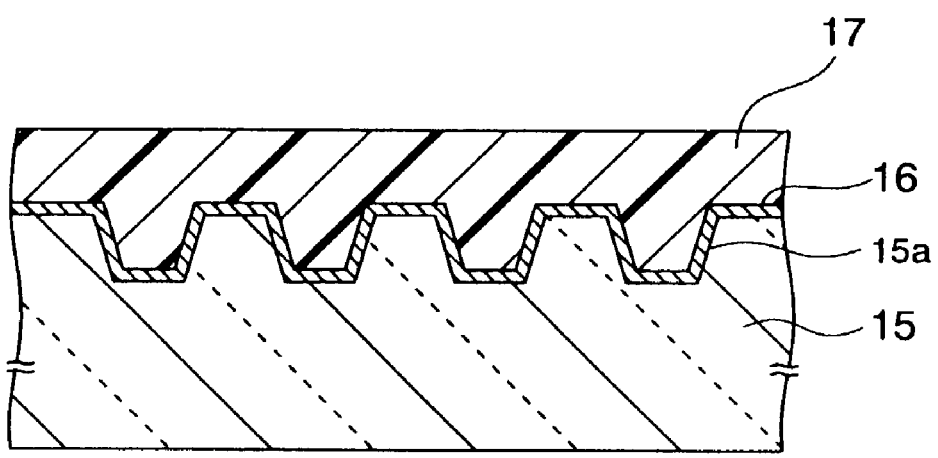

Next, as shown in FIG. 4H, the protection layer 17 is formed above the optical recording layer 16.

By the above, an optical disk of the structure shown in FIG. 2A, FIG. 2B, FIG. 3A, and FIG. 3B can be produced.

In the above optical disk, the wobble W for providing the clock information or address information is formed in the side wall portions at the inner circumferential side of the disk substrate when seen from the grooves G and at the outer circumferential side of the disk substrate when seen from the lands L among the pairs of facing side walls forming the trenches 15*a*.

By this, an optical disk where a drop in quality of the wobble signal can be prevented, an increase of the problem of cross write can be suppressed, and the wobble is desirably arranged for the production process is achieved. The reasons for this will be explained below.

Figure 5:
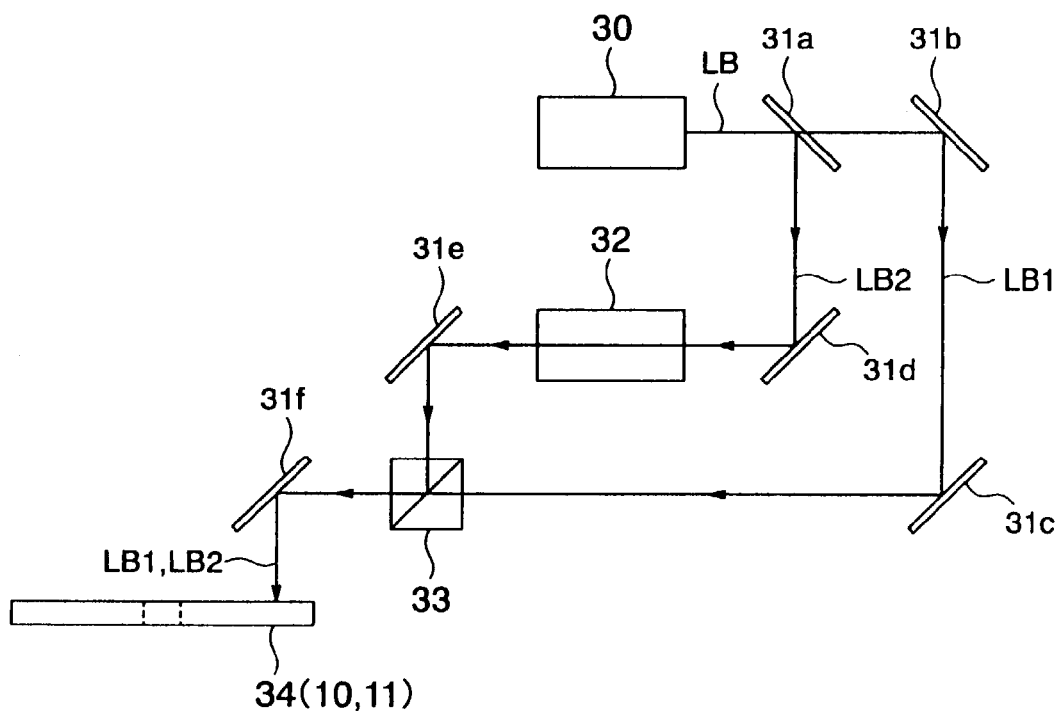
FIG. 5 is a schematic view of the configuration of an exposure apparatus (cutting machine) according to the first embodiment.

FIG. 5 is a schematic view of the configuration of an example of an exposure apparatus (cutting machine) used in the exposure step of the resist film shown in FIG. 4B described above.

A laser beam LB emitted from a laser beam source 30 such as an He—Cd laser is split into a first laser beam LB1 and a second laser beam LB2 by a half mirror 31*a*.

The first laser beam LB1 passing through the half mirror 31*a* strikes a beam combiner 33 via a mirror 31*b* and a mirror 31*c*.

On the other hand, the second laser beam LB2 reflected at the half mirror 31*a* strikes the beam combiner 33 via a mirror 31*d*, optical acoustic element 32, and mirror 31*e*.

The first laser beam LB1 and the second laser beam LB2 are combined at the beam combiner 33, reflected at a mirror 31*f*, guided to an original disk 34 comprised of a glass substrate 10 formed with a resist film 11, and used for exposure.

In the above configuration, the optical acoustic element 32 can perform control to shake an optical axis of the second laser beam LB2 by a fine angle.

Figure 6A:
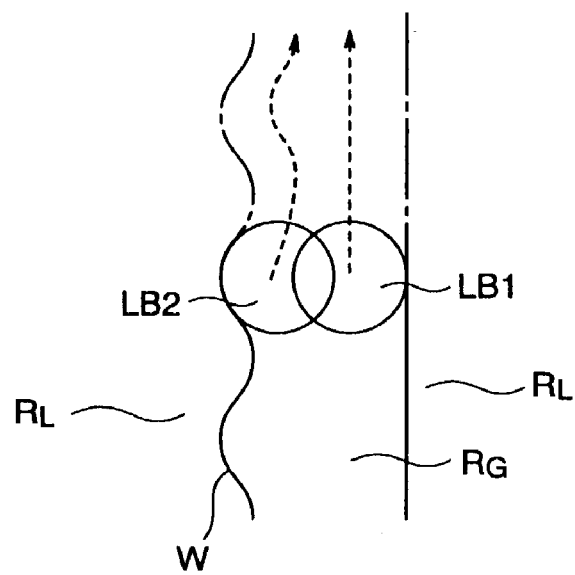
FIG. 6A is a schematic view of the state when performing exposure processing according to the first embodiment.

FIG. 6A is a schematic view of the state when performing the exposure processing by the first laser beam LB1 and the second laser beam LB2.

By superimposing the first laser beam LB1 and the second laser beam LB2, a region $R_G$ for forming a groove on the resist film is exposed, while a region $R_L$ for forming a land is prevented from being irradiated by the laser beams.

At this time, the resist film is exposed so as to finally exhibit a pattern wherein the wobble W is formed in the side wall portion at the inner circumferential side of the disk substrate when seen from the groove G and at the outer circumferential side of the disk substrate when seen from the land L in the structure of the optical disk at the interface between the region $R_G$ for forming the groove and the region $R_L$ for forming the land.

Namely, the first laser beam LB1 is swept over the film without shaking so that the endmost portion of the spot of the first laser beam LB1 forms the interface between the region $R_G$ for forming the groove and the region $R_L$ for forming the land at the side where the wobble is not to be formed, while the second laser beam LB2 is modulated by the optical acoustic element arranged on the optical axis of the second laser beam of the exposure apparatus shown in FIG. 5 and swept while slightly shaking in a direction perpendicular to the advance direction so that the endmost portion of the spot of the second laser beam LB2 forms the interface between the region $R_G$ for forming the groove and the region $R_L$ for forming the land at the side where the wobble is to be formed.

By developing the resist film exposed in this way, a resist film of a pattern having wobble as described above can be formed.

Figure 6B:
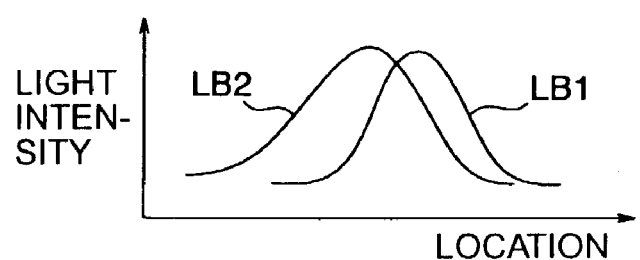
FIG. 6B is a light intensity profile of a laser beam used for the exposure processing.

FIG. 6B shows the light intensity profile of the first laser beam LB1 and the laser beam LB2 described above, wherein an ordinate shows the light intensity, and an abscissa shows the location.

The second laser beam LB2 is modulated and given coma aberration due to its being inclined more than the first laser beam LB1 and aberration of the optical acoustic element due to its passing through the element, so the beam profile has a broader width than the first laser beam LB1.

Figure 6C:
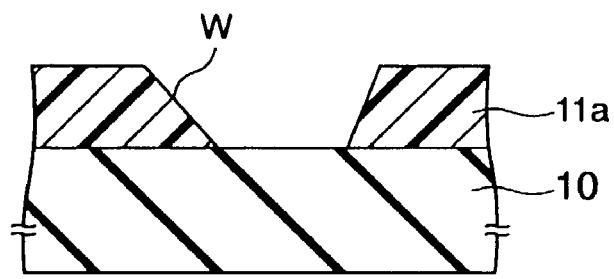
FIG. 6C is a sectional view of the original disk after the exposure and development step.

Due to the fact that the second laser beam LB2 has a profile having a broader width than the first laser beam LB1 as described above, as shown in FIG. 6C, at the sectional pattern of the resist film 11*a* formed by the exposure and development, the inclination of the wall surface of the resist film 11*a* corresponding to the interface between the region $R_G$ for forming the groove and the region $R_L$ for forming the land formed by tracing by the endmost portion of each beam becomes gentler at the side traced by the second laser beam LB2 where the wobble W is formed than the side traced by the first laser beam LB1 where the wobble is not formed.

Figure 6D:
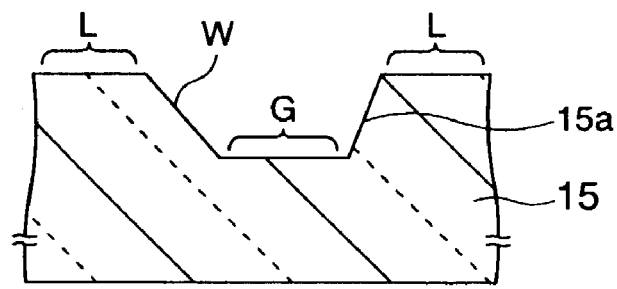
FIG. 6D is a sectional view of the disk substrate.

As a result of this, in the trench 15*a* of the disk substrate 15 obtained from the above original disc, as shown in FIG. 6D, in the wall surfaces of the trench 15*a* forming the interface between the land L and the groove G, the side where the wobble W was formed becomes the gentler slope.

Considering the situation that the wall surface on the side where the wobble W was formed becomes a gentler slope in the trench 15*a* of the disk substrate 15, when considering the film formation step of the optical recording layer, it can be explained that the formation of the wobble W in the side wall portion at the inner circumferential side of the disk substrate when seen from the groove G and at the outer circumferential side of the disk substrate when seen from the land L becomes the preferred arrangement for the following reason.

Figure 7A:
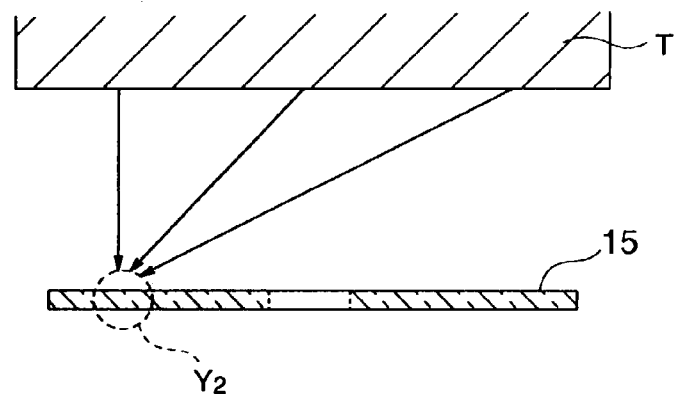
FIG. 7A is a schematic view of the state when performing film forming processing of the optical recording layer according to the first embodiment.

FIG. 7A is a schematic view of the configuration of a sputtering apparatus used in the film formation step of the optical recording layer.

The disk substrate 15 faces a target T with its trench forming surface up.

Sputtering particles flying out of the target in the sputtering step are deposited on the trench forming surface of the disk substrate 15.

Figure 7B:
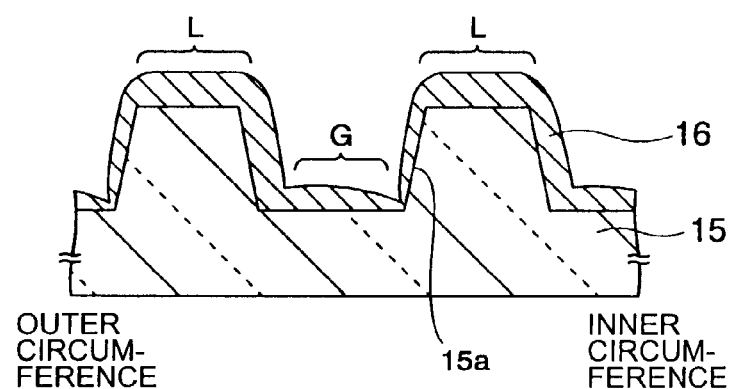
FIG. 7B is a sectional view after the film forming step.

The sputter particles from the entire surface of the target T are deposited, so due to the sputter particle component mainly obliquely striking the disk substrate 15, as shown in FIG. 7B, corresponding to an enlarged view of the $Y_2$ portion in FIG. 7A, the inner circumferential side of the recess (groove G) of the relief of the trench 15a falls in the shadow of the projection (land L) and therefore the thickness of the formed optical recording layer 16 becomes thinner, that is, unevenness of the film formation occurs.

Namely, the thickness of the optical recording layer 16 becomes smaller at the inner circumferential side of the recess (groove G) and at the outer circumferential side of the projection (land L) in the relief of the trench 15a of the disk substrate 15, while conversely the thickness of the optical recording layer 16 becomes greater at the outer circumferential side of the recess (groove G) and at the inner circumferential side of the projection (land L).

At the center of the disk substrate, the sputter particles are deposited equally from all directions, so a uniform film thickness is obtained, but usually the disk center becomes an opening region, so can not be used.

When nonuniformity occurs in the film thickness of the optical recording layer 16 as described above, anisotropy occurs in the cross write where other data is erased when writing on a land or groove. Namely, the energy transfer is large in the portion where the film thickness is great, so cross write via this thick portion is apt to occur. Accordingly, the margin of the write power for preventing cross write becomes narrow.

Figure 7C:
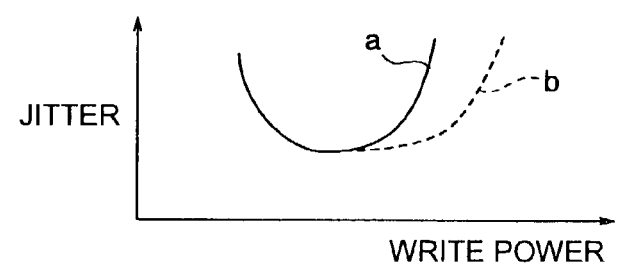
FIG. 7C shows jitter with respect to a write power.

For example, FIG. 7C shows the jitter with respect to the write power. A solid line "a" shows the case of cross write from the land L on the outer circumferential side to the groove G on the inner circumferential side, while a broken line "b" shows the case of cross write from the land L on the inner circumferential side to the groove G on the outer circumferential side.

The optical recording layer is thick from the land L on the outer circumferential side to the groove G on the inner circumferential side, so the write power region (margin) able to suppress the jitter is relatively narrow. On the other hand, the optical recording layer is thin from the land L on the inner circumferential side to the groove G on the outer circumferential side, so the write power region (margin) able to suppress the jitter is relatively wide.

In relation to the cross write described above, when considering the fact that the inclination of the wall surface of the trench due to the wobble becomes gentler as described above, the optical recording layer ends up becoming thicker at the wall surface made gentler in inclination due to the formation of the wobble, therefore cross write is apt to occur.

Since the optical recording layer becomes thinner at the inner circumferential side of the recess (groove G) of the relief of the trench 15a of the disk substrate 15 and becomes thicker at the outer circumferential side of the recess (groove G) as described above, if the wobble were provided at the outer circumferential side of the recess (groove G), the film would become further thicker and the write power margin of the cross write from the land L at the outer circumferential side to the groove G at the inner circumferential side would become increasingly narrower.

Conversely, if the wobble is provided at the inner circumferential side of the recess (groove G), the optical recording layer at the inner circumferential side of the recess (groove G) becomes thicker, but this only makes the margin of the cross write from the land L at the inner circumferential side to the groove G at the outer circumferential side narrower, where the write power margin was originally wide, therefore does not make the write power margin of the overall optical disk any narrower.

Namely, it is explained that if the wobble is provided at the inner circumferential side when seen from the recess (groove) of the disk substrate and at the outer circumferential side when seen from the projection (land), the increase of the problem of cross write can be suppressed and the wobble is desirably arranged for the production process.

Also, it is explained that the above arrangement of the wobble is preferred for other reasons in the production process.

Figure 8A:
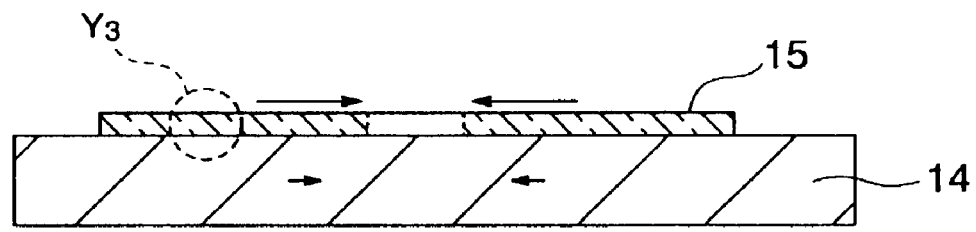
FIG. 8A is a schematic sectional view showing a step of forming a disk substrate according to the first embodiment, while FIG. 8B corresponds to an enlarged view of an $Y_3$ portion in FIG. 8A at a time of mold separation.
Figure 8B:
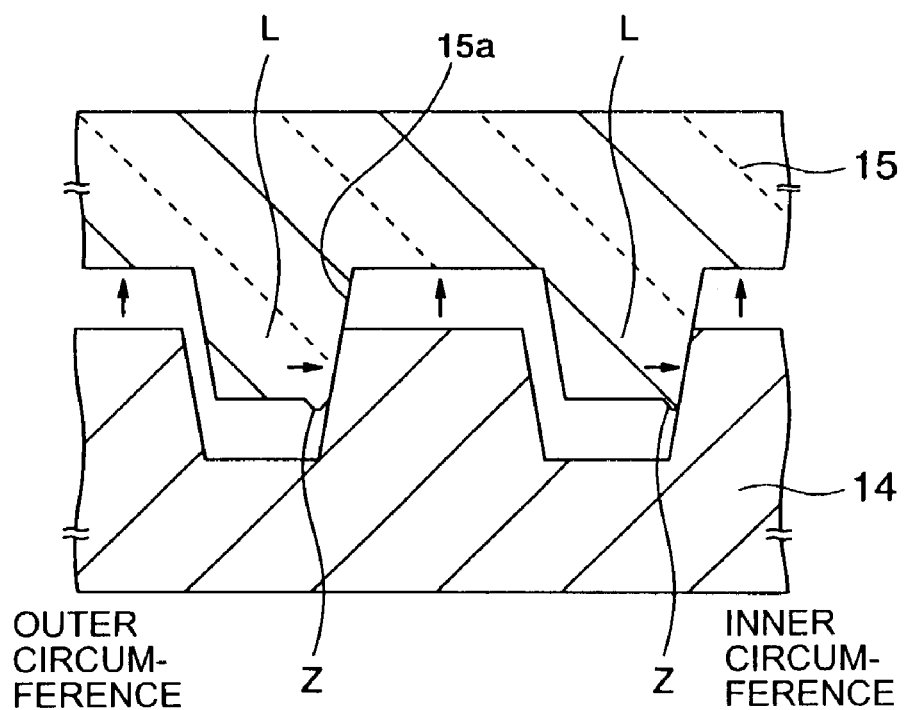

FIG. 8A is a schematic sectional view showing a step of forming on the relief pattern of the stamper 14 a polycarbonate or other plastic substrate, that is, the disk substrate 15. FIG. 8B corresponds to an enlarged view of the $Y_3$ portion in FIG. 8A when separating the disk substrate 15 from the stamper 14 in the above step.

For example, if compression molding, injection molding, 2P (photo polymerization), etc. is used to form and cool on the relief pattern of a stamper 14, which is generally made of metal, a disk substrate 15 made of polycarbonate or another plastic, since the plastic forming the disk substrate 15 has a larger linear expansion coefficient than the metal forming the stamper 14, the amount of shrinkage to the inner side of the diameter becomes larger than that of the stamper.

For this reason, at the time of mold separation, as shown in FIG. 8B, the disk substrate 15 is separated from the stamper 14 while the inner circumferential sides of the projections (lands L) of the disk substrate 15 are caught by the projections of the stamper. When the final contact area becomes small, considerable stress is applied to angle portions Z at the inner circumferential side wall surfaces of the lands L, so a dragging angle accompanied by deformation is generated.

Accordingly, the inner circumferential side wall surfaces of the lands L are apt to be damaged for the above reason. If wobble were provided there, there would be a possibility of a drop in the quality of the wobble signal.

Conversely, the outer circumferential side walls surface of the lands L will not be damaged at the time of mold separation. Therefore, if the wobble is provided there, a drop in the quality of the wobble signal can be prevented.

Namely, if wobble is provided at the inner circumferential side when seen from the recesses (groove) of the disk substrate and at the outer circumferential side when seen from the projections (lands), a drop in the quality of the wobble signal due to the damage at the time of mold separation can be prevented. Therefore, it is explained that the wobble is desirably arranged for the production process.

As described above, in the optical disk according to the present embodiment, the side wall portions at the inner circumferential side of the disk substrate when seen from the recesses (grooves) and at the outer circumferential side of the disk substrate when seen from the projections (lands) are not easily damaged at the time of formation of the disk substrate, so if the wobble is provided there, a drop in the quality of the wobble signal can be prevented, the increase of the problem of cross write can be suppressed, and, in an optical recording medium of the land-groove recording format etc. having wobble at part of the interfaces of lands and grooves, the wobble is desirably arranged for the production process.

Second Embodiment

An optical disk according to the present embodiment, in the same way as the first embodiment shown in FIG. 2, has a laminate of a disk substrate, optical recording layer, and protection layer and has an approximately disk shape having an opening portion at the center.

Figure 9A:
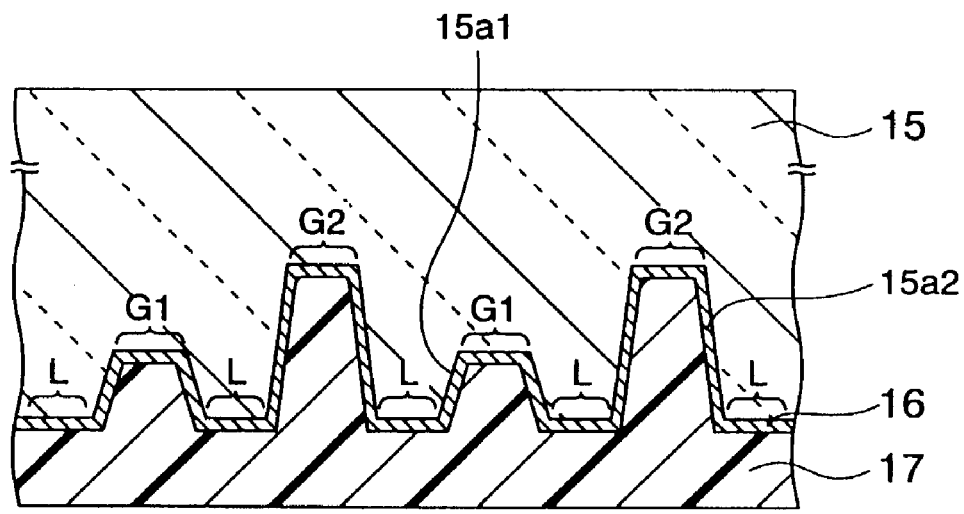

FIG. 9A is a sectional view of the optical disk according to the present embodiment.

A disk substrate 15 having a thickness D1 of 1.1 to 1.2 mm is alternately provided on one surface with a first trench $15a_1$ and a second trench $15a_2$ deeper than the first trench $15a_1$. An optical recording layer 16 comprised of for example a dielectric film, a recording film, another dielectric film, and a reflection film stacked in that order is formed on that surface. The film configuration and number of layers differ according to the type of the recording material and the design.

The protection layer 17 is formed above the optical recording layer 16.

In the above optical disk, the optical recording layer 16 has relief shapes corresponding to the first trenches $15a_1$ and the second trenches $15a_2$. The track regions are divided into regions projecting out to the protection layer 17 side when seen from the disk substrate 15, that is, the lands L, and recessed region in the first trenches $15a_1$, that is, first grooves G1, and recessed regions in the second trenches $15a_2$, that is, second grooves G2. The widths of the flat portions of the lands L, first grooves G1, and second grooves G2 are formed approximately equally.

In the present embodiment, either of for example the lands L and the grooves (first grooves G1 and second grooves G2) are used as the recording regions. It is also possible to use both regions as the recording regions.

In a depth modulation recording format where grooves differing in depth are alternately arranged as described above, the optical limit is extended by doubling the cycle of generation of the tracking error signal in length. It is therefore possible to increase the recording density.

Figure 9B:
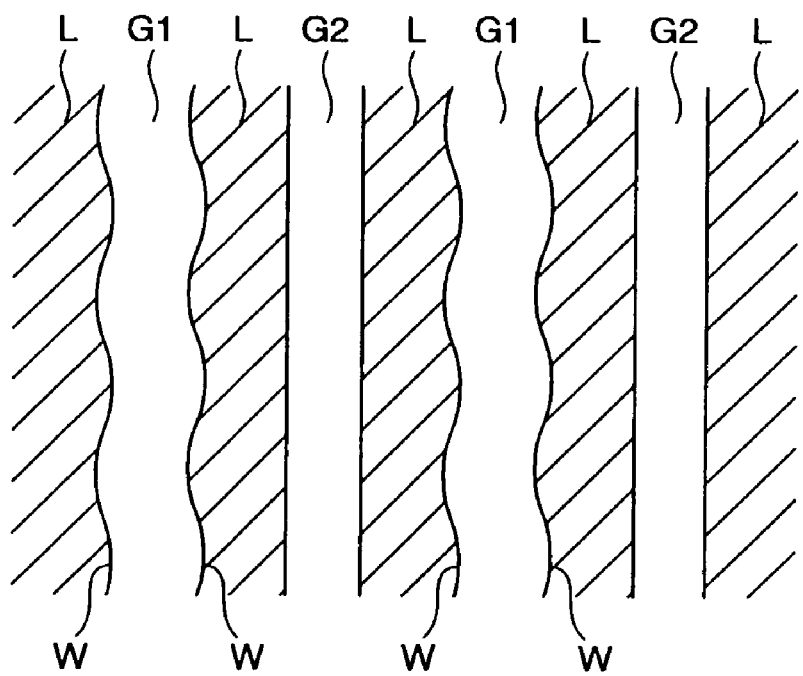
FIG. 9B is a plan view of the optical disk showing the shape and arrangement of trenches dividing the lands and grooves.

FIG. 9B is a plan view of the optical disk showing the shape and arrangement of the trenches for dividing the lands L and the grooves (first grooves G1 and second grooves G2) in the above optical disk and corresponds to a top view of the optical disk of the sectional view shown in FIG. 9A.

The wobble W for providing the clock information or address information is formed at the side wall portions of the grooves on the shallower side between the two types of grooves differing in depth (first grooves G1 and second grooves G2), that is, the first grooves G1.

The optical disk of the present embodiment, in the same way as the optical disk according to the first embodiment, can be recorded on or reproduced from by an optical disk device having the usual configuration. At the time of reproduction, the return light reflected at the optical recording layer is received at a light receiving element, and a predetermined matrix circuit or the like detects, for example, a focus error signal by the astigmatism method, a tracking error signal by the differential push pull method, or other servo error signal, an RF signal, or a wobble signal for performing the detection of a clock signal synchronized with the disk rotation and addresses etc.

The optical disk of the present embodiment described above is an optical disk of the depth modulation recording format. It is explained that the above arrangement of wobble is preferred for reasons of the production process.

Figure 10A:
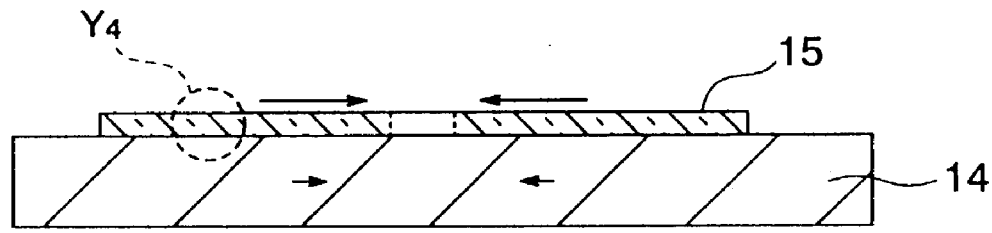
FIG. 10A is a schematic sectional view showing a step of forming the disk substrate according to the second embodiment, while FIG. 10B corresponds to an enlarged view of an $Y_4$ portion in FIG. 10A at the time of mold separation.
Figure 10B:
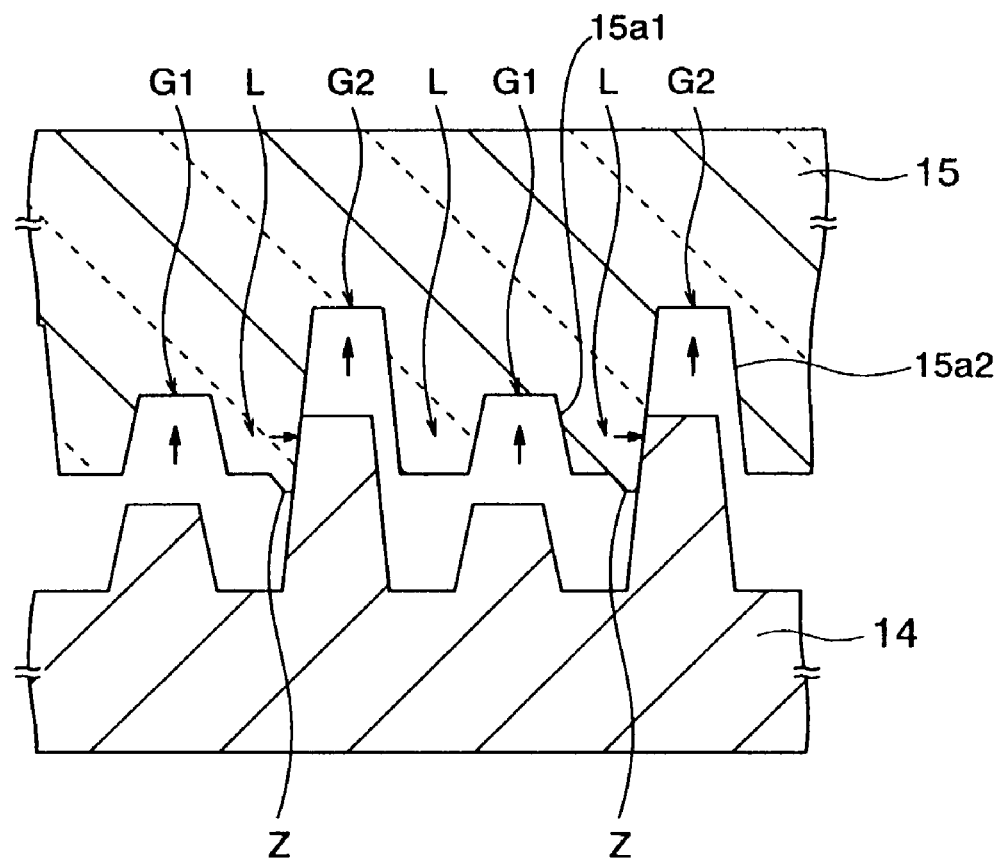

FIG. 10A is a schematic sectional view showing the step of forming on the relief pattern of a stamper 14 a polycarbonate or other plastic substrate, that is, the disk substrate 15, while FIG. 10B corresponds to an enlarged view of the $Y_4$ portion in FIG. 10A when separating the disk substrate 15 from the stamper 14 in the above step.

For example, if compression molding, injection molding, 2P (photo polymerization), or the like is used to form and cool on the relief pattern of the stamper 14, which is generally made of metal, a disk substrate 15 made of polycarbonate or another plastic, since the plastic forming the disk substrate 15 has a larger linear expansion coefficient than the metal forming the stamper 14, the amount of shrinkage to the inner side of the diameter becomes larger than that of the stamper.

For this reason, at the time of the mold separation, as shown in FIG. 10B, the disk substrate is separated from the stamper 14 while the inner circumferential sides of the lands L on the sides facing the deeper second grooves G2 are caught by the projections of the stamper. When the final contact area becomes smaller, a considerable stress is applied to the angle portions Z of the inner circumferential side wall surfaces facing the second grooves G2, so a dragging angle accompanied by deformation is generated.

Accordingly, the wall surfaces of the trenches facing the deeper second grooves G2 are apt to be damaged for the above reasons. If the wobble were provided there, there would be a possibility of a drop in the quality of the wobble signal.

Conversely, the wall surfaces of the shallower trenches are not damaged at the time of mold separation, so if the wobble is provided there, a drop in the quality of the wobble signal can be prevented.

The damage at the time of mold separation described above becomes conspicuous when the grooves are deep, for example, about 100 nm or more. In such a case, the effect of arranging the wobble as described above becomes large.

As described above, the optical disk according to the present embodiment has a plurality of types of trenches differing in depth for dividing the track regions into lands and the grooves. The side wall surfaces of the shallower trenches are not apt to be damaged at the time of formation of the disk substrate, so if providing the wobble there, a drop in the quality of the wobble signal can be prevented, and, in an optical recording medium of the depth modulation recording format etc. having the wobble in part of the interfaces between the lands and the grooves, the wobble is desirably arranged for the production process.

The present invention is not limited to the above embodiments.

For example, the layer configuration of the optical recording layer is not limited to the configuration explained in the embodiments. Various structures can be employed in accordance with the material etc. of the recording film.

Further, other than a phase change type optical recording medium, the present invention can be applied to a magneto-optic recording medium or an optical disk medium using an organic pigment materials.

Further, in order to produce the disk substrate, a plurality of intermediate members such as a metal master and mother are formed, but it is also possible to use just one intermediate member or possible to use two or more intermediate members other than those explained in the above embodiments.

Other than this, various modifications can be made within a range not out of the gist of the present invention.

INDUSTRIAL APPLICABILITY

According to the optical recording medium of the present invention, it is possible to provide an optical recording medium of the land-groove recording format, depth modulation recording format, etc. having wobble in part of the interfaces of the lands and the grooves, where the wobble is desirably arranged for the production process.

The invention claimed is:

1. An optical recording medium comprising
an approximately disk-shaped disk substrate formed in a surface thereof with a plurality of types of trenches differing in depth and including first trenches of a first depth and second trenches of a second depth deeper than the first depth and having projections and recesses divided for every track region by the trenches,
an optical recording layer formed on said disk substrate on said trench forming surface and having relief shapes corresponding to the trenches, and
a protection film formed on said optical recording layer, wherein
a wobble is formed in side wall portions of said first trenches among said plurality of types of trenches differing in depth and no wobble is formed in side wall portions of the second trenches.

2. An optical recording medium as set forth in claim 1, wherein said wobble provides at least clock information or address information.

3. An optical recording medium as set forth in claim 1, wherein one of the projections and the recesses divided for every said track region on the optical recording layer is used as a recording region.

4. An optical recording medium as set forth in claim 1, wherein said disk substrate is a plastic substrate to which a relief pattern is transferred from a stamper having relief of a reverse pattern to the pattern of projections and recesses divided by said trenches.

* * * * *